United States Patent
Watanabe

(10) Patent No.: US 6,996,293 B1
(45) Date of Patent: Feb. 7, 2006

(54) REDUCED IMAGE FORMING METHOD AND APPARATUS

(75) Inventor: Yoshihiko Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 09/593,775

(22) Filed: Jun. 14, 2000

(30) Foreign Application Priority Data

Jun. 17, 1999  (JP) .......................................... 11/171576
May 9, 2000   (JP) ...................................... 2000/135780

(51) Int. Cl.
*G06K 9/36* (2006.01)

(52) U.S. Cl. .................... 382/284; 382/190; 382/294; 358/450

(58) Field of Classification Search ............... 382/171, 382/177, 190, 282, 284, 294, 298, 179, 180, 382/187, 195, 198, 251, 277, 290, 295, 299; 358/1.2, 538, 540, 450, 453, 452; 345/629, 345/630, 634, 635; 348/584, 588
See application file for complete search history.

(56) References Cited

U.S. PATENT DOCUMENTS

| | | | | |
|---|---|---|---|---|
| 4,290,084 A | * | 9/1981 | Minshull et al. ............ 358/451 |
| 4,667,248 A | * | 5/1987 | Kanno ........................ 358/452 |
| 4,808,987 A | * | 2/1989 | Takeda et al. ............... 340/721 |
| 4,850,026 A | * | 7/1989 | Jeng et al. .................. 382/185 |
| 5,323,310 A | * | 6/1994 | Robinson ........................ 704/2 |
| 5,333,253 A | * | 7/1994 | Kishihata ..................... 345/792 |
| 5,457,753 A | * | 10/1995 | Sasahara ..................... 382/275 |
| 5,517,587 A | * | 5/1996 | Baker et al. ................ 382/296 |
| 5,555,362 A | * | 9/1996 | Yamashita et al. .......... 715/517 |
| 5,583,949 A | * | 12/1996 | Smith et al. ................ 382/199 |
| 5,613,016 A | * | 3/1997 | Saitoh ........................ 382/174 |
| 5,663,809 A | * | 9/1997 | Miyaza et al. .............. 358/450 |
| 5,682,441 A | | 10/1997 | Ligtenberg et al. ......... 382/232 |
| 5,717,940 A | | 2/1998 | Peairs ......................... 395/777 |
| 5,745,664 A | * | 4/1998 | Nomura et al. ............ 358/1.18 |
| 5,930,405 A | * | 7/1999 | Chida ......................... 382/284 |
| 6,043,823 A | * | 3/2000 | Kodaira et al. ............. 345/619 |
| 6,167,410 A | * | 12/2000 | Imamura ..................... 715/530 |
| 6,301,386 B1 | * | 10/2001 | Zhu et al. ................... 382/176 |
| 6,339,651 B1 | * | 1/2002 | Tian et al. .................. 382/105 |
| 6,356,314 B1 | * | 3/2002 | Takebe ........................ 348/564 |

* cited by examiner

*Primary Examiner*—Bhavesh M. Mehta
*Assistant Examiner*—Yosef Kassa
(74) *Attorney, Agent, or Firm*—Fitzpatrick, Cella, Harper & Scinto

(57) ABSTRACT

In an electric filing apparatus, a document is read, and the read document is divided into blocks by a predetermined dividing number. Further, the divided block is divided into a partial image or partial character train, and a partial image or partial character train is extracted from a predetermined position every block. The extracted partial images or partial character trains are combined, thereby forming a reduced image smaller than an original image or character train. When selecting a document registered by the user, a list of the reduced images is displayed.

46 Claims, 18 Drawing Sheets

FIG. 4

21 IMAGE BLOCK A    20    23 IMAGE BLOCK C 5,394,387

INFORMATION RECORDING/REPRODUCING METHOD

BACKGROUND OF THE INVENTION

1. Field of the Invention

This invention related to an information recording-/reproducing method of effecting the recording and/or reproduction of information on a disk-like recording medium, and particularly to an information recording-/reproducing method in which the recording area of a recording medium is divided into a plurality of zones in the radial direction of the recording medium and the recording/reproduction of information is effected with the rotational speed of the disk made to be different in each zone, whereby the spatial record length of a recording pit is made constant over the entire recording area.

2. Related Background Art

Information recording/reproducing methods of recording/reproducing information on a disk-like recording medium (hereinafter referred to as the disk) include a magnetic recording/reproducing method directed to a floppy disk and an optical information recording/reproducing method directed to a CD or a magneto-optical disk.

The diameter of disks used in these methods is prescribed as 5.25 or 3 inches, and the recent technical task is how densely information can be recorded on disks of such a diameter.

Various information recording/reproducing methods have heretofore been devised to solve such a task and above all, attention has been paid to a method called MCAV (modified constant angular velocity) or ZCAV (zone constant angular velocity). According to this method, the recording area on the disk is divided into a plurality of zones in the radial direction of the disk, and the recording/reproducing frequency of each zone is made higher from the inner peripheral zone toward the outer peripheral zone, thereby making the recording density on the inner and outer peripheries of the recording area constant. According to this method, as compared with the conventional method of effecting recording/reproduction with the number of revolutions and the recording/reproducing frequency kept constant, there is obtained an about 50% increase in recording capacity.

Another method to which attention has been paid is a method called MCLV (modified constant linear velocity) or ZCLV (zone constant linear velocity) in which the recording area on the disk is divided into a plurality of zones in the radial direction of the disk and the number of revolutions of the disk in the respective zones is made lower from the inner peripheral zone toward the outer peripheral zone, thereby making the recording density on the inner and outer peripheries of the recording area constant. Again by this method, as compared with the conventional CAV method, there is obtained an about 50% increase in capacity.

In the former method, however, the linear velocity of the disk is increased toward the outer periphery of the disk and this leads to a problem that the transfer speed of reproduced data is varied by the reproducing position of the disk, and the usability of the device as an information recording/reproducing apparatus is poor. Also, a reproducing signal processing system must accomodate the transfer speed of the outermost peripheral data, and if such a signal processing system does this, it can waste the inner peripheral portion of the disk.

Also, in the latter method, the transfer speed of reproduced data is constant in the inner and outer peripheries of the disk, but when the seeking of a recording/reproducing head is performed beyond a zone, a long time is taken until the number of revolutions of a spindle motor for rotating the disk becomes equal to the number of revolutions of the corresponding zone, and this has led to a problem that the seeking time becomes long.

SUMMARY OF THE INVENTION

The present invention has been made in view of the above-noted problems and has as its object the provision of an information recording/reproducing method in which the recording density is made constant on the inner and outer peripheral portions of a disk to thereby increase the recording density, the transfer speed of reproduced data is constant in the inner and outer peripheral portions of the disk, and a long seeking time is not required.

To achieve the above object, an information recording/reproducing method according to the present invention is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting the recording of reproduction of the information without changing the number of revolutions if the amount of information to be recorded or reproduced is equal to or smaller than a predetermined amount when seeking is effected from a zone in which a recording/reproducing head is on standby to a different zone to effect the recording or reproduction.

Also, an information recording/reproducing method is provided in which a recording area is divided into a plurality of zones in the radial direction of a disk so that the lengths of recording pits may become the same in the entire recording area of the disk and the recording-/reproduction of information is effected with the number of revolutions of the disk changed in each zone from the inner peripheral zone toward the outer peripheral zone. The method comprises the step of effecting, when a zone in which the frequency of recording or reproduction exceeds a predetermined value is created in a series of recording or reproducing operations, the next recording or reproduction at a number of revolutions corresponding to that zone.

Also, an information recording/reproducing method is provided in which a recording area is divided into a plurality of zones in the radial direction of a disk so that the lengths of recording pits may become the same in the entire recording area of the disk and the recording/ /reproduction of information is effected with the number of revolutions of the disk changed in each zone from the inner peripheral zone toward the outer peripheral zone. The method comprises the step of effecting, when a zone in which recording or reproduction is effected and continues a predetermined or greater number of times, the next recording or reproduction at a number of revolutions corresponding to that zone.

Also, an information recording/reproducing method is provided in which a recording area is divided into a plurality of zones in the radial direction of a disk so that

22 IMAGE BLOCK B      24 IMAGE BLOCK D

INFORMATION RECORDING/REPRODUCING METHOD

BACKGROUND OF THE INVENTION

1. Field of the Invention
This invention related to an information recording/reproducing method of effecting the recording and/or reproduction of information on a disk-like recording medium, and particularly to an information recording/reproducing method in which the recording area of a recording medium is divided into a plurality of zones in the radial direction of the recording medium and the recording/reproduction of information is effected with the rotational speed of the disk made to be different in each zone, whereby the spatial record length of a recording pit is made constant over the entire recording area.

2. Related Background Art
Information recording/reproducing methods of recording/reproducing information on a disk-like recording medium (hereinafter referred to as the disk) include a magnetic recording/reproducing method directed to a floppy disk and an optical information recording/reproducing method directed to a CD or a magneto-optical disk.

The diameter of disks used in these methods is prescribed as 5.25 or 3 inches, and the recent technical task is how densely information can be recorded on disks of such a diameter.

Various information recording/reproducing methods have heretofore been devised to solve such a task and above all, attention has been paid to a method called MCAV (modified constant angular velocity) or ZCAV (zone constant angular velocity). According to this method, the recording area on the disk is divided into a plurality of zones in the radial direction of the disk, and the recording/reproducing frequency of each zone is made higher from the inner peripheral zone toward the outer peripheral zone, thereby making the recording density on the inner and outer peripheries of the recording area constant. According to this method, as compared with the conventional method of effecting recording/reproduction with the number of revolutions and the recording/reproducing frequency kept constant, there is obtained an about 50% increase in recording capacity.

Another method to which attention has been paid is a method called MCLV (modified constant linear velocity) or ZCLV (zone constant linear velocity) in which the recording area on the disk is divided into a plurality of zones in the radial direction of the disk and the number of revolutions of the disk in the respective zones is made lower from the inner peripheral zone toward the outer peripheral zone, thereby making the recording density on the inner and outer peripheries of the recording area constant. Again by this method, as compared with the conventional CAV method, there is obtained an about 50% increase in capacity.

In the former method, however, the linear velocity of the disk is increased toward the outer periphery of the disk and this leads to a problem that the transfer speed of reproduced data is varied by the reproducing position of the disk, and the usability of the device as an information recording/reproducing apparatus is poor. Also, a reproducing signal processing system must accomodate the transfer speed of the outermost peripheral

2 data, and if such a signal processing system does this, it can waste the inner peripheral portion of the disk.

Also, in the latter method, the transfer speed of reproduced data is constant in the inner and outer peripheries of the disk, but when the seeking of a recording/reproducing head is performed beyond a zone, a long time is taken until the number of revolutions of a spindle motor for rotating the disk becomes equal to the number of revolutions of the corresponding zone, and this has led to a problem that the seeking time becomes long.

SUMMARY OF THE INVENTION

The present invention has been made in view of the above-noted problems and has as its object the provision of an information recording/reproducing method in which the recording density is made constant on the inner and outer peripheral portions of a disk to thereby increase the recording density, the transfer speed of reproduced data is constant in the inner and outer peripheral portions of the disk, and a long seeking time is not required.

To achieve the above object, an information recording/reproducing method according to the present invention is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting the recording of reproduction of the information without changing the number of revolutions if the amount of information to be recorded or reproduced is equal to or smaller than a predetermined amount when a zone is shifted from a zone in which a recording/reproduction had been effected to a different zone to record the corresponding information.

Also, an information recording/reproducing method is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting, when a zone in which the frequency of recording or reproduction exceeds a predetermined value is created in a series of recording or reproducing operations, the next recording or reproduction at a number of revolutions corresponding to that zone.

Also, an information recording/reproducing method is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting, when a zone in which recording or reproduction is effected and continues a predetermined or greater number of times, the next recording or reproduction at a number of revolutions corresponding to that zone.

Also, an information recording/reproducing method is provided in which a recording area is divided into a plurality of zones in the radial direction of a disk so that

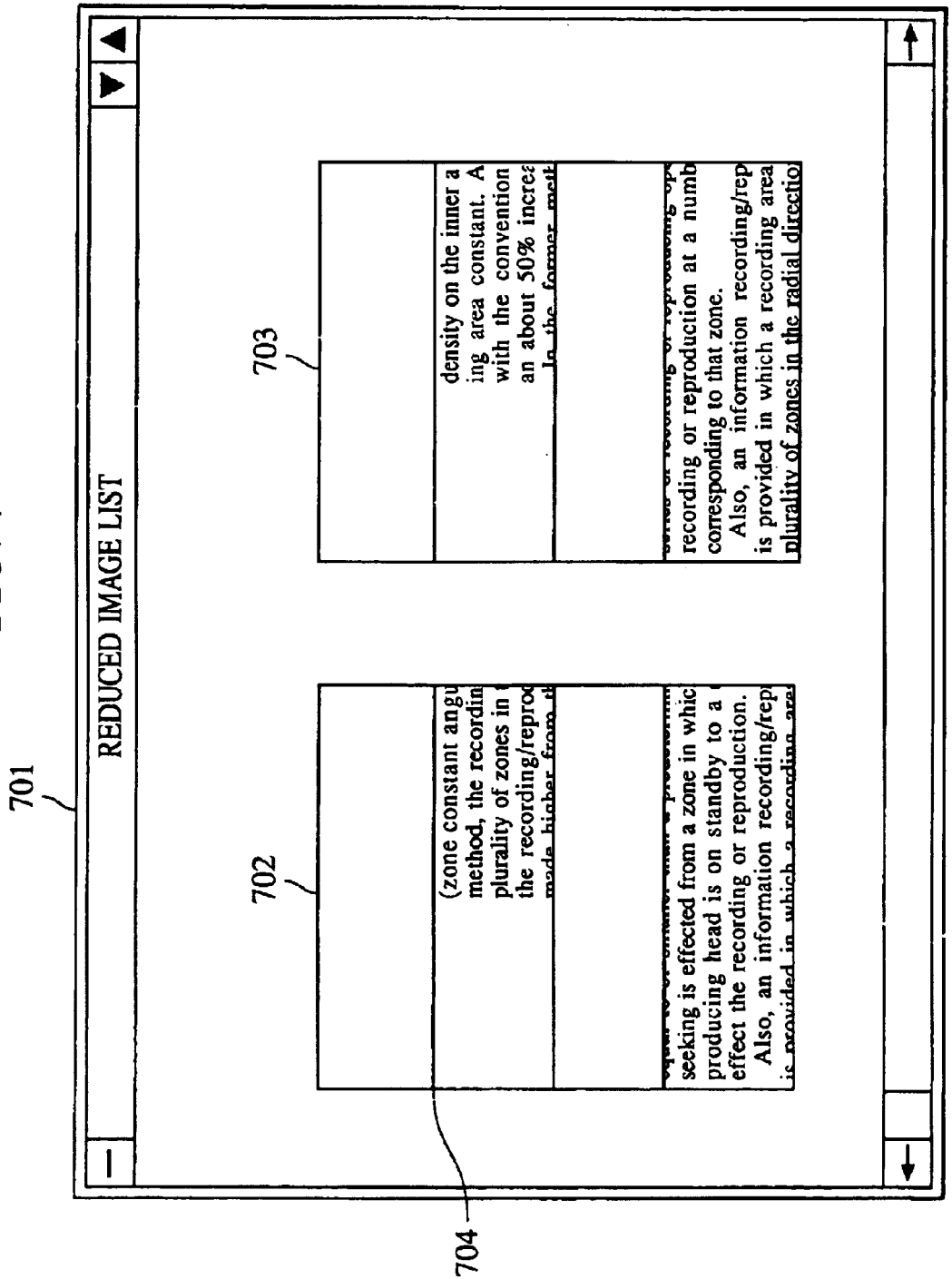

FIG. 8

This figure shows a patent document page (US Patent 5,394,[?]) titled "INFORMATION RECORDING/REPRODUCING METHOD" with portions highlighted/marked by hatched overlay regions labeled 801, 802, 803, and 804. The underlying document text reads:

---

INFORMATION RECORDING/REPRODUCING METHOD

BACKGROUND OF THE INVENTION

1. Field of the Invention

This invention related to an information recording/reproducing method of effecting the recording and/or reproduction of information on a disk-like recording medium, and particularly to an information recording/reproducing method in which the recording area of a recording medium is divided into a plurality of zones in the radial direction of the recording medium and the recording/reproduction of information is effected with the rotational speed of the disk made to be different in each zone, whereby the spatial record length of a recording pit is made constant over the entire recording area.

2. Related Background Art

Information recording/reproducing methods of recording/reproducing information on a disk-like recording medium (hereinafter referred to as the disk) include a magnetic recording/reproducing method directed to a floppy disk and an optical information recording/reproducing method directed to a CD or a magneto-optical disk.

The diameter of disks used in these methods is prescribed as 5.25 or 3 inches, and the recent technical task is how densely information can be recorded on disks of such a diameter.

Various information recording/reproducing methods have heretofore been devised to solve such a task and above all, attention has been paid to a method called MCAV (modified constant angular velocity) or ZCAV (zone constant angular velocity). According to this method, the recording area on the disk is divided into a plurality of zones in the radial direction of the disk, and the recording/reproducing frequency of each zone is made higher from the inner peripheral zone toward the outer peripheral zone, thereby making the recording density on the inner and outer peripheries of the recording area constant. According to this method, as compared with the conventional method of effecting recording/reproduction with the number of revolutions and the recording/reproducing frequency kept constant, there is obtained an about 50% increase in recording capacity.

Another method to which attention has been paid is a method called MCLV (modified constant linear velocity) or ZCLV (zone constant linear velocity) in which the recording area on the disk is divided into a plurality of zones in the radial direction of the disk and the number of revolutions of the disk in the respective zones is made lower from the inner peripheral zone toward the outer peripheral zone, thereby making the recording density on the inner and outer peripheries of the recording area constant. Again by this method, as compared with the conventional CAV method, there is obtained an about 50% increase in capacity.

In the former method, however, the linear velocity of the disk is increased toward the outer periphery of the disk and this leads to a problem that the transfer speed of reproduced data is varied by the reproducing position of the disk, and the usability of the device as an information recording/reproducing apparatus is poor. Also, a reproducing signal processing system must accomodate the transfer speed of the outermost peripheral

[...] speed of reproduced data is constant in the inner and outer peripheries of the disk, but when the seeking of a recording/reproducing head is performed beyond a zone, a long time is taken until the number of revolutions of a spindle motor for rotating the disk becomes equal to the number of revolutions of the corresponding zone, and this has led to a problem that the seeking time becomes long.

SUMMARY OF THE INVENTION

The present invention has been made in view of the above-noted problems and has as its object the provision of an information recording/reproducing method in which the recording density is made constant on the inner and outer peripheral portions of a disk to thereby increase the recording density, the transfer speed of reproduced data is constant in the inner and outer peripheral portions of the disk, and a long seeking time is not required.

To achieve the above object, an information recording/reproducing method according to the present invention is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting the recording of reproduction of the information without changing the number of revolutions if the amount of information to be recorded or reproduced is lower than a predetermined amount when seeking is effected from one zone in which a recording/reproducing head is located by to a different zone to effect the recording or reproduction.

Also, an information recording/reproducing method is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting, when a zone in which the frequency of recording or reproduction exceeds a predetermined value is created in a series of recording or reproducing operations, the next recording or reproduction at a number of revolutions corresponding to that zone.

Also, an information recording/reproducing method is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting, when a zone in which recording or reproduction is effected and continues a predetermined or greater number of times, the next recording or reproduction at a number of revolutions corresponding to that zone.

Also, an information recording/reproducing method is provided in which a recording area is divided into a plurality of zones in the radial direction of a disk so that

121e CHARACTER TRAIN BLOCK A

~~information recording/reproducing method~~ BACKGROUND OF THE INVENTION 1 Field of the Invention This ~~invention relates to an information recording/reproducing method~~ of effecting the recording and/or reproduction of informationon a disk-like recording medium, and particularly to an informationrecording/reproducing method in which the recording area of arecording medium is divided into a plurality of zones in the radialdirection of the recording medium and the recording/reproduction ofinformation is effected with the rotational speed of the disk made tobe different in each zone, whereby the spatial record length of a recording pit is made constant over the entire recording area. 2 Related Background Art Information recording/reproducing methods of recording/reproducing information on a disk-like recording medium (hereinafter referred to as the disk) include a magnetic recording/reproducing method directed to a floppy disk and an optical information recording/reproducing method directed to a CD or a magneto-optical disk. The diameter of disks used in these methods is prescribed as 5.25or 3 inches, and the recent technical task is how denselyinformation can be recorded on disks of such a diameter. Various information recording/reproducing methods have heretofore been devised to solve such a task and above all, attention has beenpaid to a method called MCAV (modified constant angular velocity) orZCAV (zone constant angular velocity). According to this method, the recording 122e CHARACTER TRAIN BLOCK B ~~area on the disk is divided into a plurality of zones in the radial direction of the disk, and the recording/reproducing frequency of each zone is made higher from the inner~~ peripheral zone toward the outer peripheral zone, thereby making the recording density on the inner and outer peripheries of the recording area constant.. According to this method, as compared with the conventional method of effecting recording reproduction with the number of revolutions and the recording/reproducing frequency kept constant, there is obtained an about 50% increase in recording capacity. Another method to which attention has been paid is a method called MCLV (modified constant linear velocity) or ZCLV (zone constant linear velocity) in which the recording area on the disk is divided into a plurality of zones in the radial direction of the disk and the number of revolutions of the disk in the respective zones is made lower from the inner peripheral zone toward the outer peripheral zone, thereby making the recording density on the inner and outer peripheries of the recording area constant. Again by this method, as compared with the conventional CAV method, there is obtained an about 50% increase in capacity. In the former method, however, the linear velocity of the disk is increased toward the outer periphery of the disk and this leads to a problem that the transfer speed of reproduced data is varied by the reproducing position of the disk, and the usability of the device as an information recording/reproducing apparatus is ~~poor. Also, a reproducing signal processing system must accomodate the transfer speed of the outermost peripheral data, and if such a signal processing system does this, it~~ can waste the inner peripheral portion of the disk. Also, in the latter method, the transfer speed of reproduced data is constant in the inner and outer peripheries of the disk. but when the seeking of a recording/reproducing head is performed beyond a zone, a long time is taken until the numbe of revolutions of a spindle motor for rotating the disk becomes equal to the number of revolutions of the corresponding zone, and this has led to a problem that the seeking time becomes long. SUMMARY OF THE INVENTION The present invention has been made in view of the above-noted problems and has as its object the provision of an information recording/reproducing method in which the recording density is made constant on the inner and outer peripneral portions of a disk to thereby increase the recording density, the transfer speed of reproduced data is constant in the inner and outer peripheral portions of the disk, and a long seeking time is not required. To achieve the above object, an information recording/reproducing method according to the present invention is provided in which a recording area is divided into a plurality of zones in the radial direction of a disk so that the lengths of recording pits may become the same in the entire recording area of the disk and the recording/reproduction of information is effected with the number 124e CHARACTER TRAIN BLOCK D ~~of revolutions of the disk changed in each zone from the inner peripheral zone toward the outer peripheral zone. The method comprises the step of effecting the recording~~ or reproduction of the information without changing the number of revolutions if the amount of information to be recorded or reproduced is equal to or smaller than a predetermined amount when seeking is effected from a zone in which a recording/reproducing head is on standby to a different zone to effect the recording or reproduction. Also, an information recording/reproducing method is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting, when a zone in which the frequency of recording or reproduction exceeds a predetermined value is created in a series of recording or reproducing operations, the next recording or reproduction at a number of revolutions corresponding to that zone. Also, an information recording/reproducing method is provided in which a recording area is divided into a plurality of zones in the radial direction of a disk so that 123e CHARACTER TRAIN BLOCK C

REDUCED IMAGE FORMING METHOD AND APPARATUS

BACKGROUND OF THE INVENTION

1. Field of the Invention

The present invention relates to reduced image forming method and apparatus which are suitable for an electric filing apparatus for searching, displaying, and printing image data of a document stored with relation to predetermined managing information, etc.

2. Description of the Related Art

Recently, there has been published an electric filing apparatus for storing image data of a document formed by reading the document by a scanner, etc. with relation to document managing information and searching, displaying, printing the information, and the like. According to the electric filing apparatus, hitherto, in case of registering document managing information such as a document name, a number of pages, registered date, and a keyword, as and displaying a document list and a search result list, etc., the document managing information is displayed as information for identifying the document. However, it is difficult to identify the outline of the document by using only the document managing information. This situation results in further proposing an electric filing apparatus capable of forming and registering a reduced image of the document and displaying the reduced image in the document list and search result list.

FIG. 10 is a diagram showing a functional construction example of a general electric filing apparatus for displaying a reduced image in a document list and a search result list. The electric filing apparatus has; a document reading function unit 1000; a reduced image forming function unit 1001; a document storing function unit 1002; and a display control function unit 1003, as exemplified in FIG. 10. Among them, the document reading function unit 1000 reads image data of a document by a scanner device, etc. (not shown). The reduced image forming function unit 1001 forms image data which is reduced with a proper size by thinning out a dot, etc. from the image data of the document read by the document-reading function unit 1000. The document storing function unit 1002 stores the image data of the document read by the document reading function unit 1000 and the reduced image data of the document formed by the reduced image forming function unit 1001, with the relation therebetween. The display control function unit 1003 controls an operation for displaying the image data of the document and the reduced image which are stored in the document storing function unit 1002, for instance, displays a document list based on the reduced image shown in FIG. 11.

However, according to the conventional electric filing apparatus, in case of displaying the document list and the search result list, the outline of the document can be identified from the reduced image of the document, but only a layout of the whole document can be identified and a character written to the document cannot discriminated. This arises a problem that it is extremely difficult to identify a document having a similar layout and a document having no distinctive feature which has not large character and no figure from the reduced image. A preferable example is a reduced displaying example of a patent specification shown in FIG. 12.

The example indicates the reduced image of 2 pages in a publication of a U.S. patent application, and it is impossible to discriminate what is written in both of the pages displayed in the right and left in the least.

SUMMARY OF THE INVENTION

The present invention is devised in view of the aforementioned problems. It is an object of the present invention to form a reduced image capable of easily identifying the contents of even a document having a similar layout and a document having no distinctive feature in case of displaying a list of documents and a search result list.

To accomplish the object, according to one construction of the present invention, there is provided a reduced image forming apparatus, comprising:

extracting means for extracting a plurality of partial images from an original image;

generating means for combining the plurality of partial images extracted by the extracting means and generating a combined image smaller than the original image; and indicating means for indicating the combined image generated by the generating means.

To accomplish the object, according to another construction of the present invention, there is provided a reduced image forming apparatus, comprising:

converting means for converting an original image into a character train;

extracting means for extracting a partial character train from the character train converted by the converting means;

generating means for combining a plurality of partial character trains extracted by the extracting means, converting the combined partial character trains into an image, and generating a combined image smaller than the original image; and indicating means for indicating the combined image generated by the generating means.

BRIEF DESCRIPTION OF THE DRAWINGS

FIG. 4 is a conceptual diagram showing document image data;

FIG. 5 is a diagram for explaining the division into a partial image and the extraction of the partial image according to the present invention;

FIG. 7 is a diagram showing a display form of the reduced image according to the present embodiment;

FIG. 8 is a diagram for explaining the division into the partial image and the extraction of the partial image according to a modified example;

FIG. 15 is a diagram for explaining the division into a partial character train and the extraction of the partial character train according to the second embodiment and a third embodiment;

DESCRIPTION OF THE PREFERRED EMBODIMENTS

Three embodiments will be described with reference to the accompanied drawings hereinbelow.

(First Embodiment)

Figure 1:
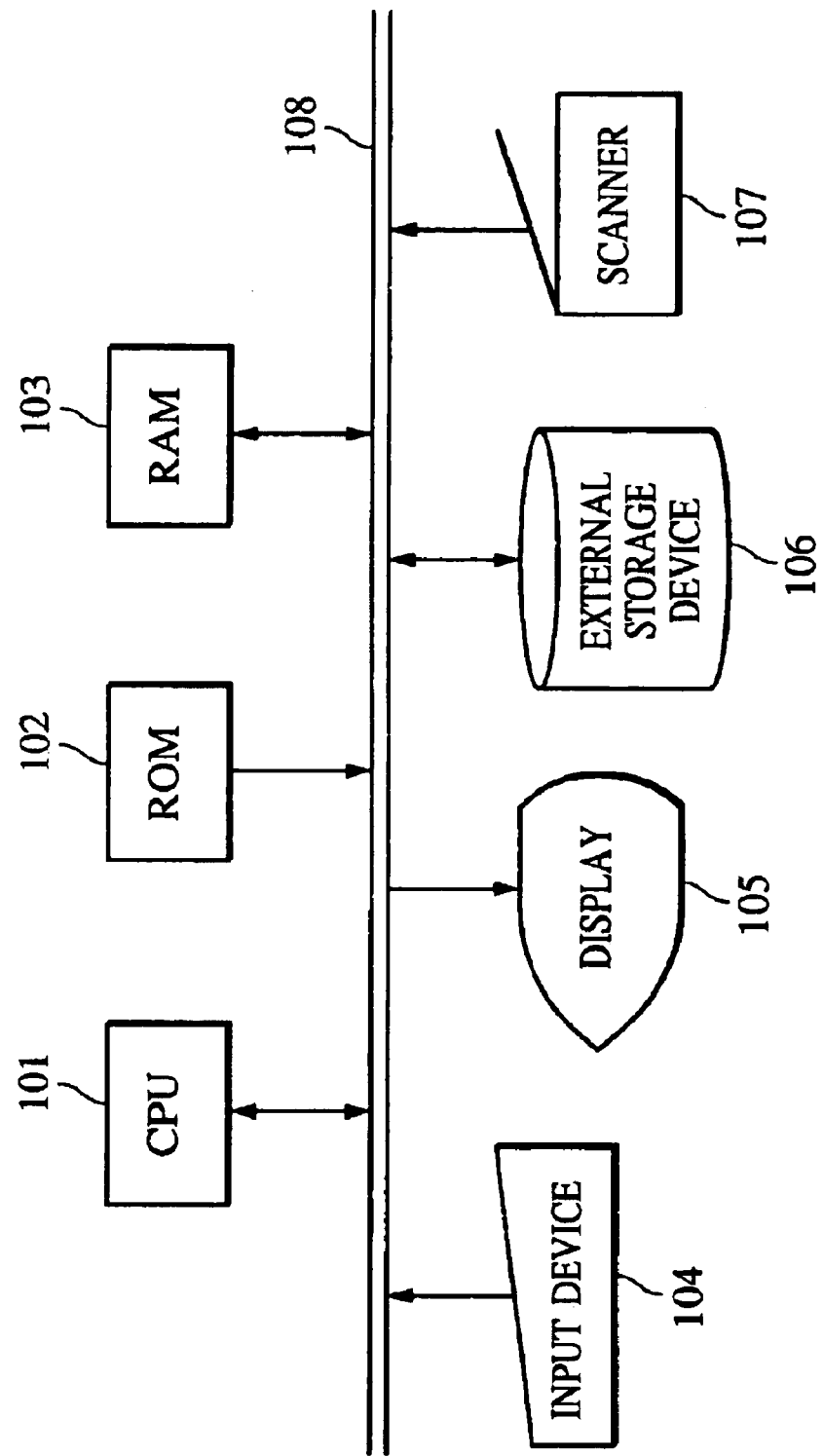
FIG. 1 is a block diagram showing an outline of an apparatus construction of an electric filing apparatus according to the present embodiment.

FIG. 1 is a block diagram showing an outline of an apparatus construction of an electric filing apparatus according to the present embodiment. Reference numeral 101 denotes a CPU which executes various control operations in the electric filing apparatus on the basis of the a control program stored in an ROM 102 and an RAM 103; 102 the ROM which stores the control program executed by the CPU 101 and various data; and 103 the RAM which provides an area to store the control program executed by the CPU 101 and a work area of the CPU 101.

Reference numeral 104 denotes an input device having a keyboard or pointing device; 105 a display which displays various images under the control operation by the CPU 101; 106 an external storage device which stores image data and a varieties of application programs; and 107 a scanner which reads an original image optically and converts the read image into digital data which is processable by the CPU 101.

Figure 2:
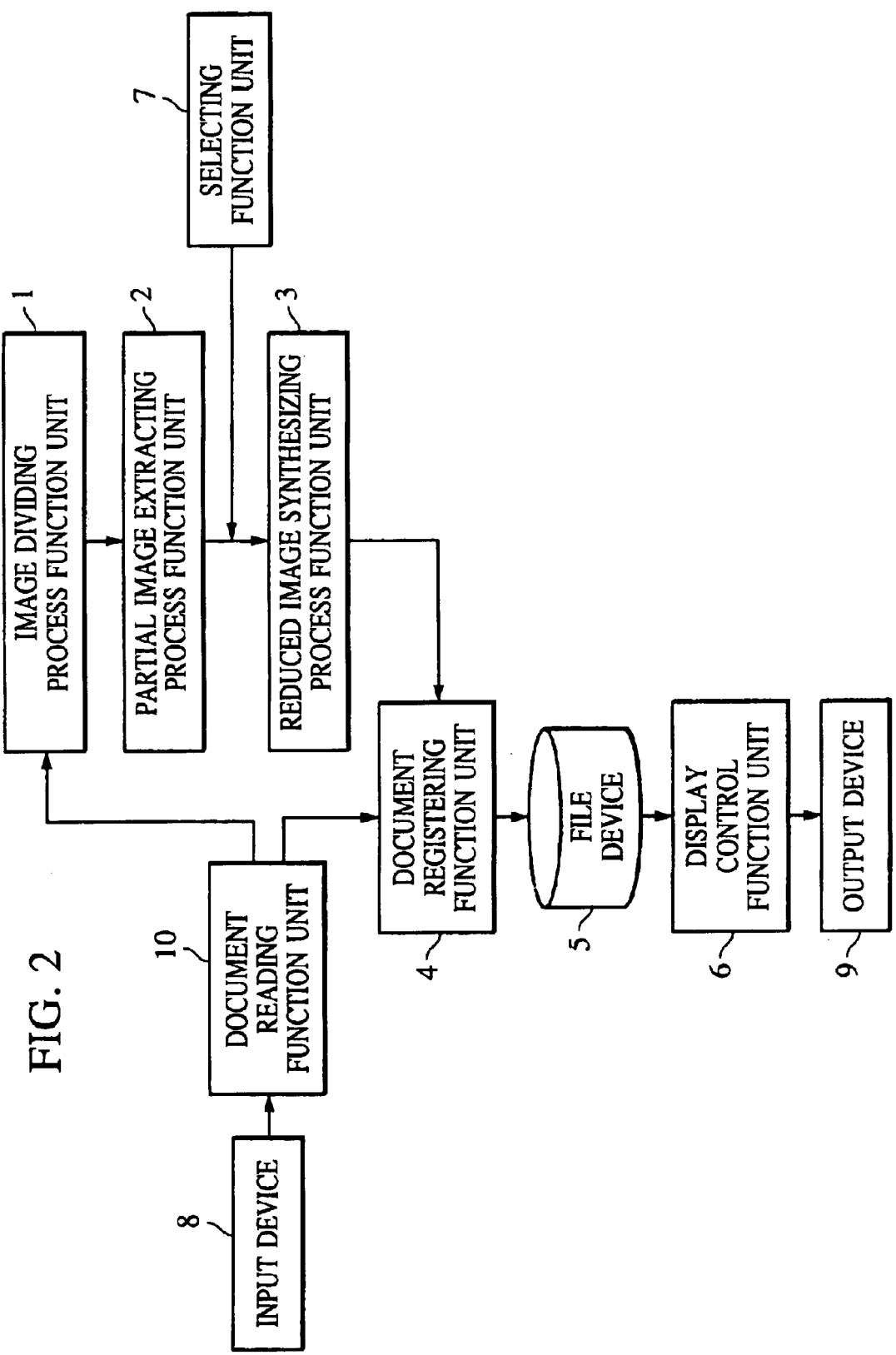
FIG. 2 is a block diagram showing a functional construction of the electric filing apparatus according to the present embodiment.

FIG. 2 is a block diagram showing a functional construction of the electric filing apparatus according to the present embodiment. Referring to FIG. 2, reference numeral 1 denotes an image dividing process function unit; 2 a partial image extracting process function unit; 3 a reduced image combining process function unit; 4 a document registering function unit; 5 a filing device; 6 a display control function unit; 7 a selecting function unit; 8 an input device; 9 an output device; and 10 a document reading function unit. Note that the CPU 101 executes the control program which is loaded in the RAM 103 from the external storage device 106 and controls the scanner 107 and external storage device 106, thereby realizing the function units.

Figure 3:
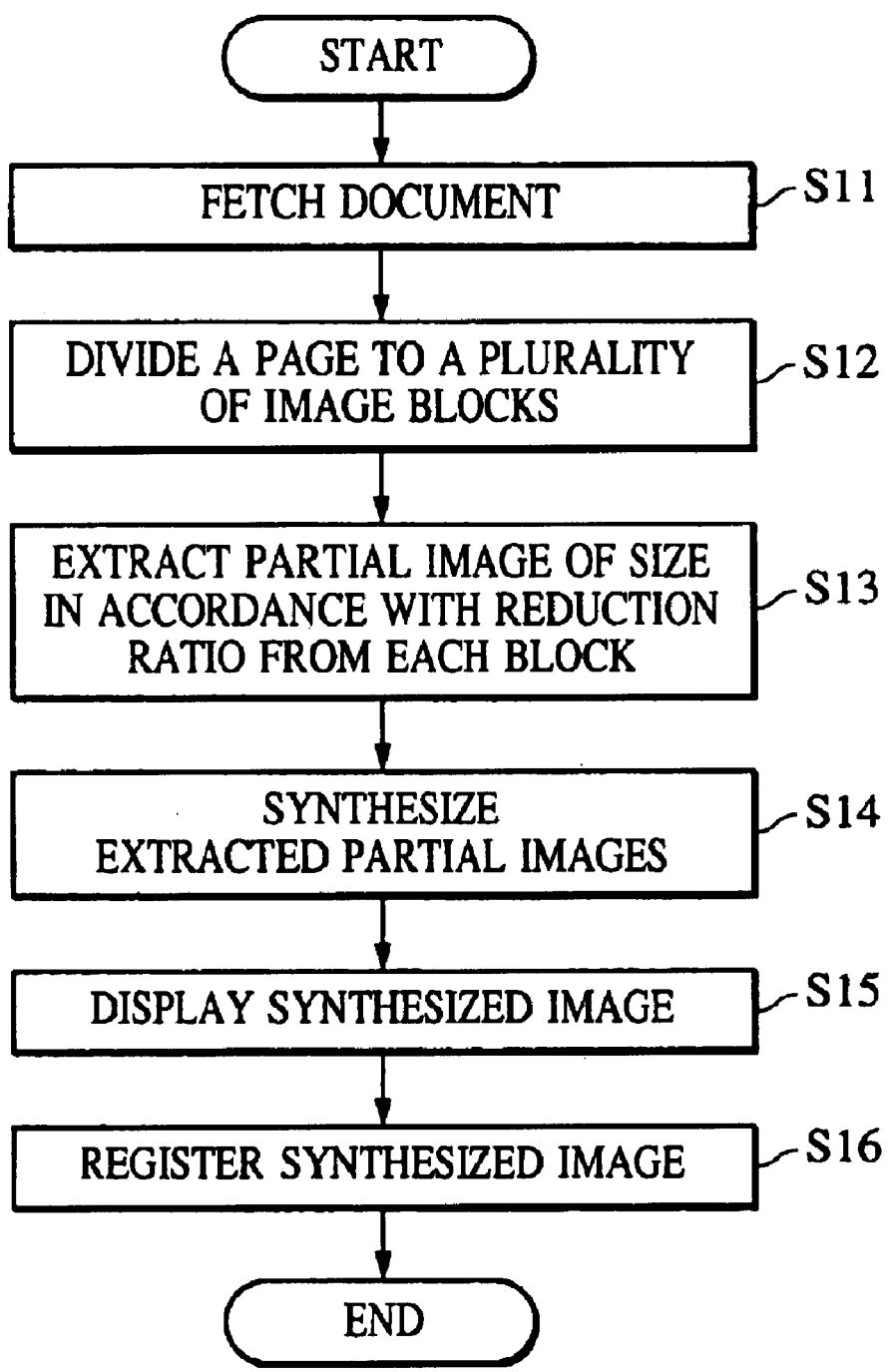
FIG. 3 is a flowchart for explaining an operation of the electric filing apparatus according to the present embodiment.

FIG. 3 is a flowchart for explaining the operation of the electric filing apparatus according to the present embodiment. The operation of the present embodiment will be described with reference to FIGS. 2 and 3 hereinbelow.

To start with, the document reading function unit 10 inputs document image data as a processing target from the input device 8 (such as the scanner 107 and external storage device 106) and stores the data into the memory (RAM 103) (step S11). The document image data may be data of a 400 dpi-resolution which is read by the scanner 107 in real time or may be data which is previously read and stored in the external storage device 106.

The image dividing process function unit 1 uniformly divides the document image data stored in the RAM 103 by a predetermined dividing number, thereby dividing the document image data into a plurality of image blocks (step S12).

According to the present embodiment, an image 20 (one page of a publication of a U.S. patent application) of an A4 size is uniformly divided into four blocks, as shown in FIG. 4. FIG. 4 is a conceptual diagram showing the document image data stored in the RAM 103. The divided blocks are labeled as image blocks A, B, C, and D (21 to 24). It is a purpose of this division to extract features from the four portions in the uniform arrangement on the image.

The partial image extracting process function unit 2 extracts a partial image having a predetermined amount (a predetermined size) from each image block which is divided by the image dividing process function unit 1 (step S13). It is noted that the extracting amount is determined dependently upon a rate of the size of the reduced image on the display 105 and the size of the original image on paper.

Normally, a plurality of reduced images are displayed in a reduced image list. If assuming that the size of an image is equal to about 5 cm, for example, on a 17 inch-display, it is possible to display eight reduced images.

An image corresponding to the A4 size has a width of about 20 cm, so that the reduction ratio is set to ¼ one-dimensionally. That is, the reduction ratio is equal to 1/16 on the area. Accordingly, if extracting only an area of 1/16 from each image block shown in FIG. 4, the sum of width of four image blocks is equal to about 5 cm on the display.

Therefore, according to the present embodiment, each image block is uniformly divided into sixteen partial images, as shown in FIG. 5, and the partial image is extracted from the image blocks one by one. According to the present invention, the selecting function unit 7 is set to select the head partial image in each image block. Four partial images (501 to 504) as shown by hatched portions in FIG. 5 are extracted.

Figure 6:
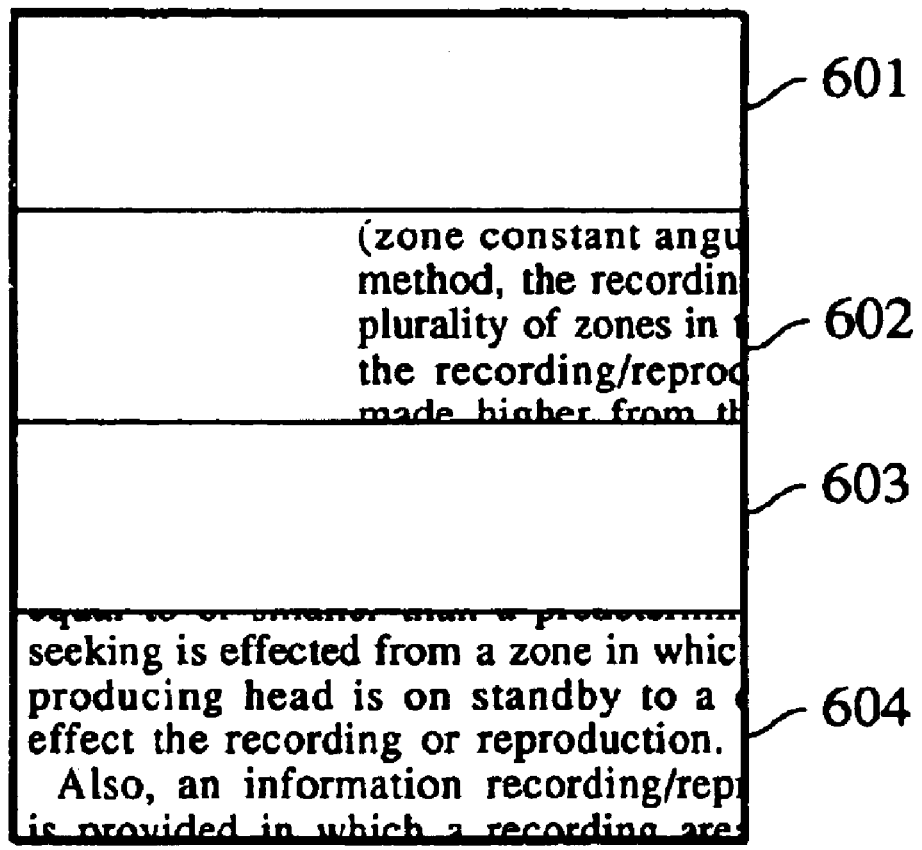
FIG. 6 is a diagram for explaining a state in which reduced images are combined by using the extracted partial image shown in FIG. 5.

The reduced image combining process function unit 3 vertically aligns the partial images extracted by the partial image extracting process function unit 2, thereby constructing one reduced image, as shown in FIG. 6, and stores the reduced image into the memory (RAM 103) (step S14). In other words, the constructed reduced image is composed of an extracted partial image 601 of an image block A21, an extracted partial image 602 of an image block B22, an extracted partial image 603 of an image block C23, and an extracted partial image 604 of an image block D24, in the descending order. Further, the thus-combined image is reduced within a range in capable of discriminating a character.

Since the resolution of a CRT is normally equal to about 100 dpi, the size capable of recognizing one character on the CRT is limited to about 2 mm every character width. The original used in the present embodiment is a publication of a U.S. patent application, and the size of one character is about 2 mm on the paper. Because the image in this example is scanned by the scanner 107 having the 400 dpi-resolution, the image is reduced to ¼. The reduced image is displayed on a window 701 on a screen of the display 105 as reduced images (702, 703) via the display control function unit 6, as shown in FIG. 7. Incidentally, FIG. 7 shows to display the reduced image obtained by the processes.

The document registering function unit 4 registers the document image data read by the document reading function unit 10 and the reduced image processed by the reduced image combining process function unit 3 into the file device 5 with relationship therebetween (step S16). The file device 5 stores the document image data and document managing information such as a keyword with a relation therebetween as a database. The display control function unit 6 controls an operation to display the image data in a character area stored in the file device 5 to the output device 9 (such as the display 105). Incidentally, although the CRT is used as a display in the present embodiment, not only the CRT but also an LCD may be used if using them as a display.

As mentioned above, according to the present embodiment, the image extracted from a plurality of areas in one page is reduced and indicated within a decidable range, so that the operator can discriminate the contents of the indicated document easily. That is, even with respect to a document having a similar layout or a document with no distinctive feature, so long as the reduced image is used, the character can be recognized throughout the document, though a part of the document is one part. Therefore, it is able to identify the document easily.

Normally, a document has a margin and the publication of the U.S. patent application is set to have a margin of about $\frac{1}{16}$ vertically. On the contrary, the selecting function unit 7 shown in the embodiment is set to uniquely select the head portion of each image block. A space portion is extracted in portions of the image blocks A21 and C23 as a result of the combination of the reduced images, as shown by 601 and 603 in FIG. 6. The quantity of information is decreased and the advantage is decreased to the half (no feature is extracted from the portions of the image blocks A21 and C23).

Figure 9:
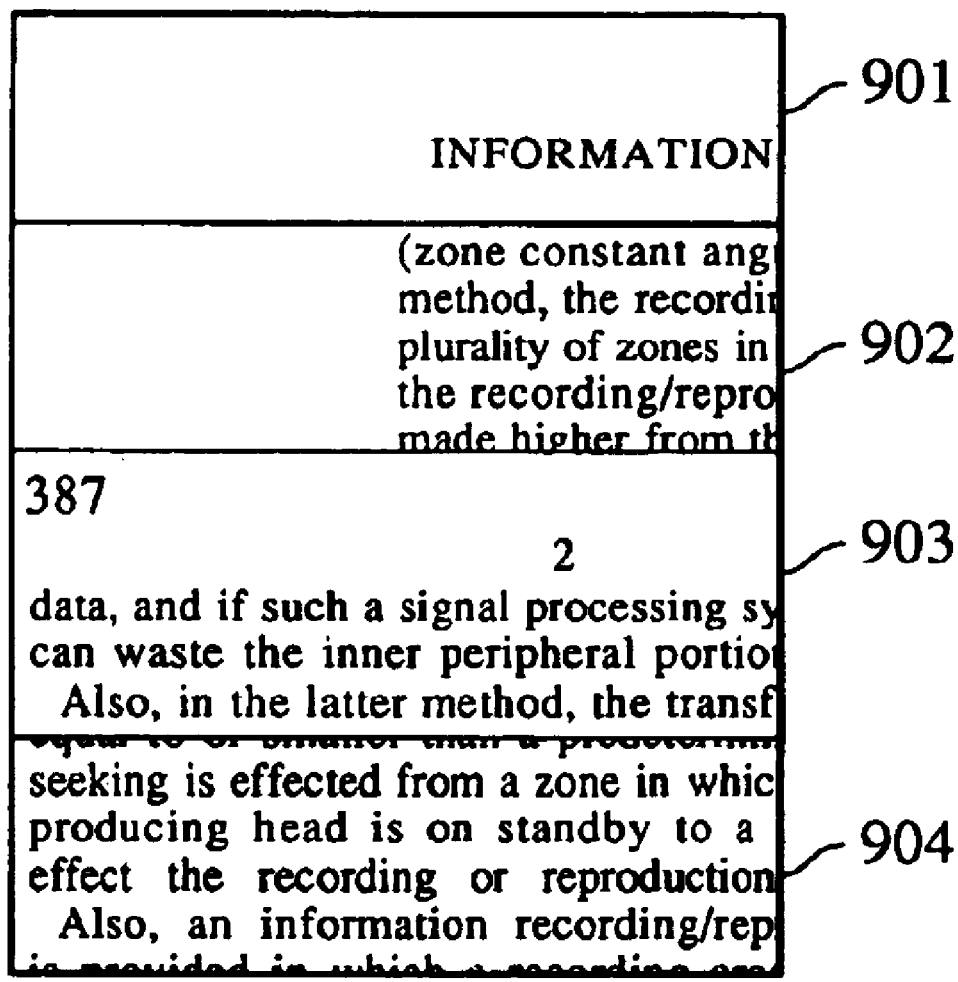
FIG. 9 is a diagram for explaining a state in which the reduced images are combined by using the extracted partial image shown in FIG. 8.
Figure 10:
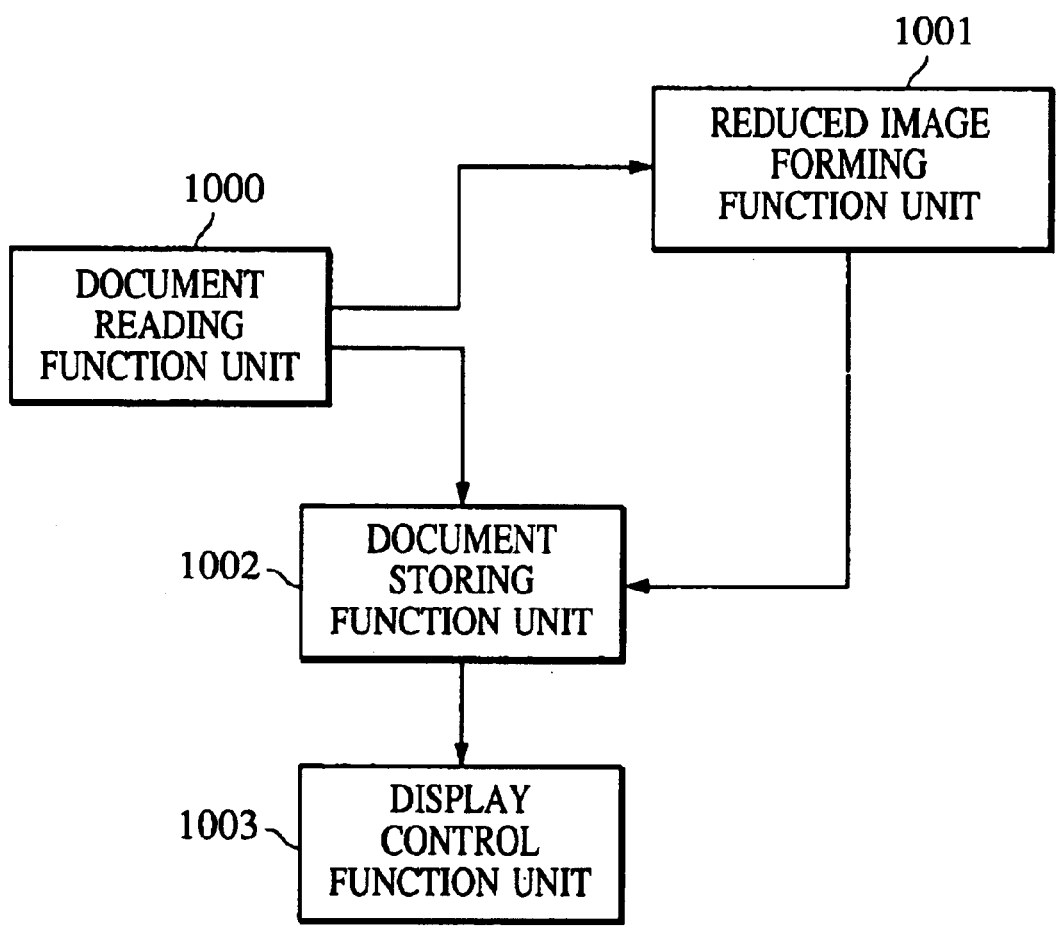
FIG. 10 is a diagram showing a functional construction example of a general electric filing apparatus for displaying the reduced image in the document list and the search result list.
Figure 11:
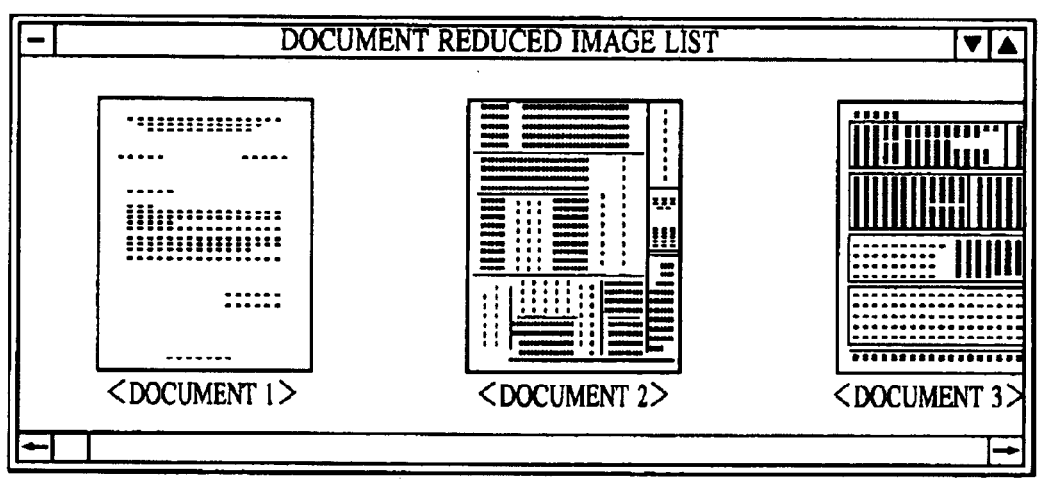
FIG. 11 is a diagram showing an example to display the list of the documents on the basis of the reduced image in the general electric filing apparatus.
Figure 12:
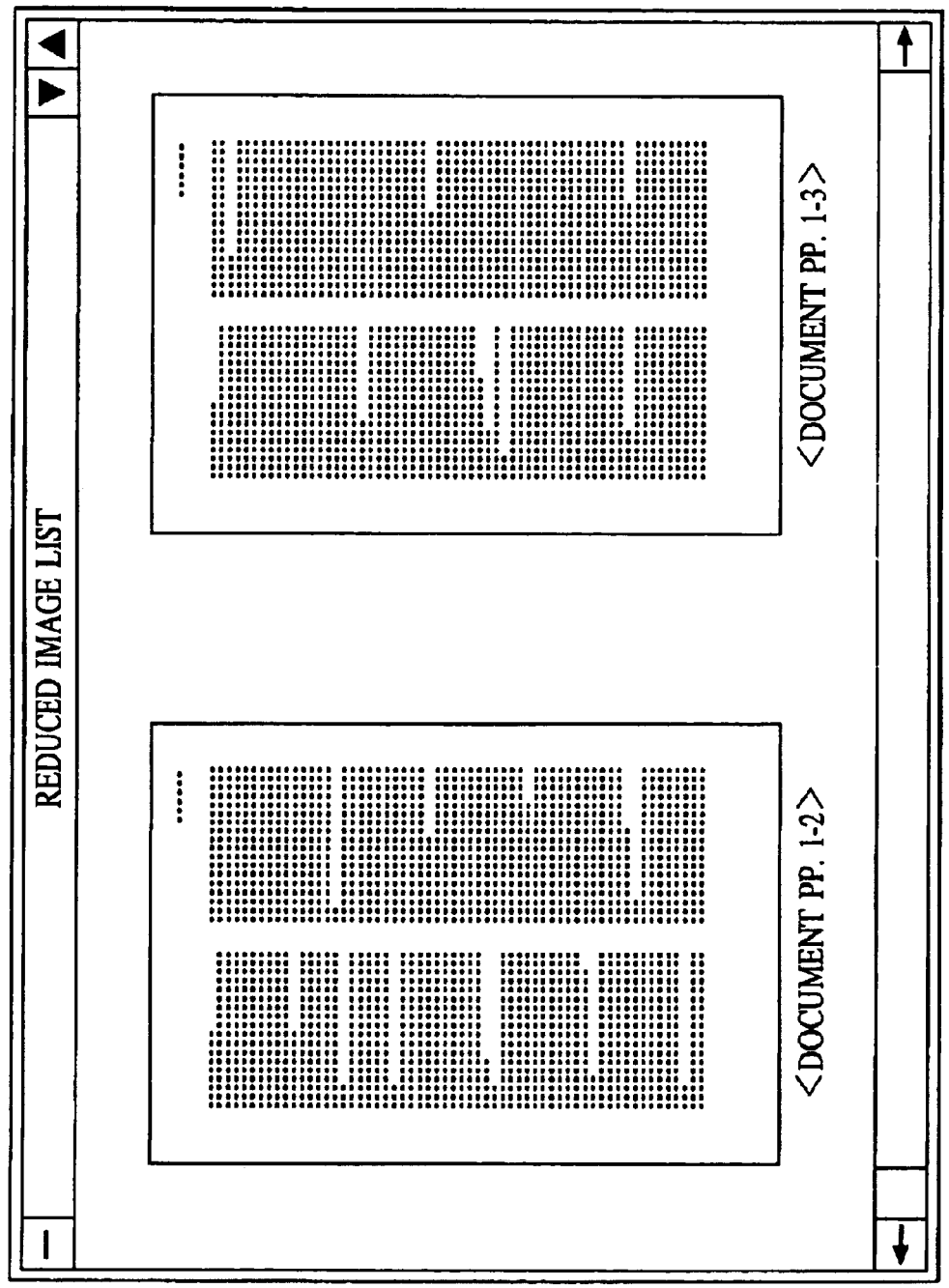
FIG. 12 is a diagram showing an example to display the list of the documents on the basis of the reduced image in the general electric filing apparatus.

Setting values of the selecting function unit 7 may be set to extract the partial images which are located at the second order from the head in the image blocks A21 and C23, and to extract the head partial images from the image blocks B22 and D24. When setting the foregoing, hatched portions 801 to 804 shown in FIG. 8 become an extraction target. Consequently, with regard to a combined reduced-image as shown in FIG. 9, the partial image 801 in FIG. 8 becomes an extracted partial image 901; the partial image 802 in FIG. 8 an extracted partial image 902; the partial image 803 in FIG. 8 an extracted partial image 903; and the partial image 804 in FIG. 8 an extracted partial image 904. As compared with those in FIG. 6, the quantity of information can be increased.

(Second Embodiment)

A second embodiment according to the present invention will be described in detail with reference to the accompanied drawings hereinbelow.

The outline of an apparatus construction is as same as that of FIG. 1 which has been described in the first embodiment.

Figure 13:
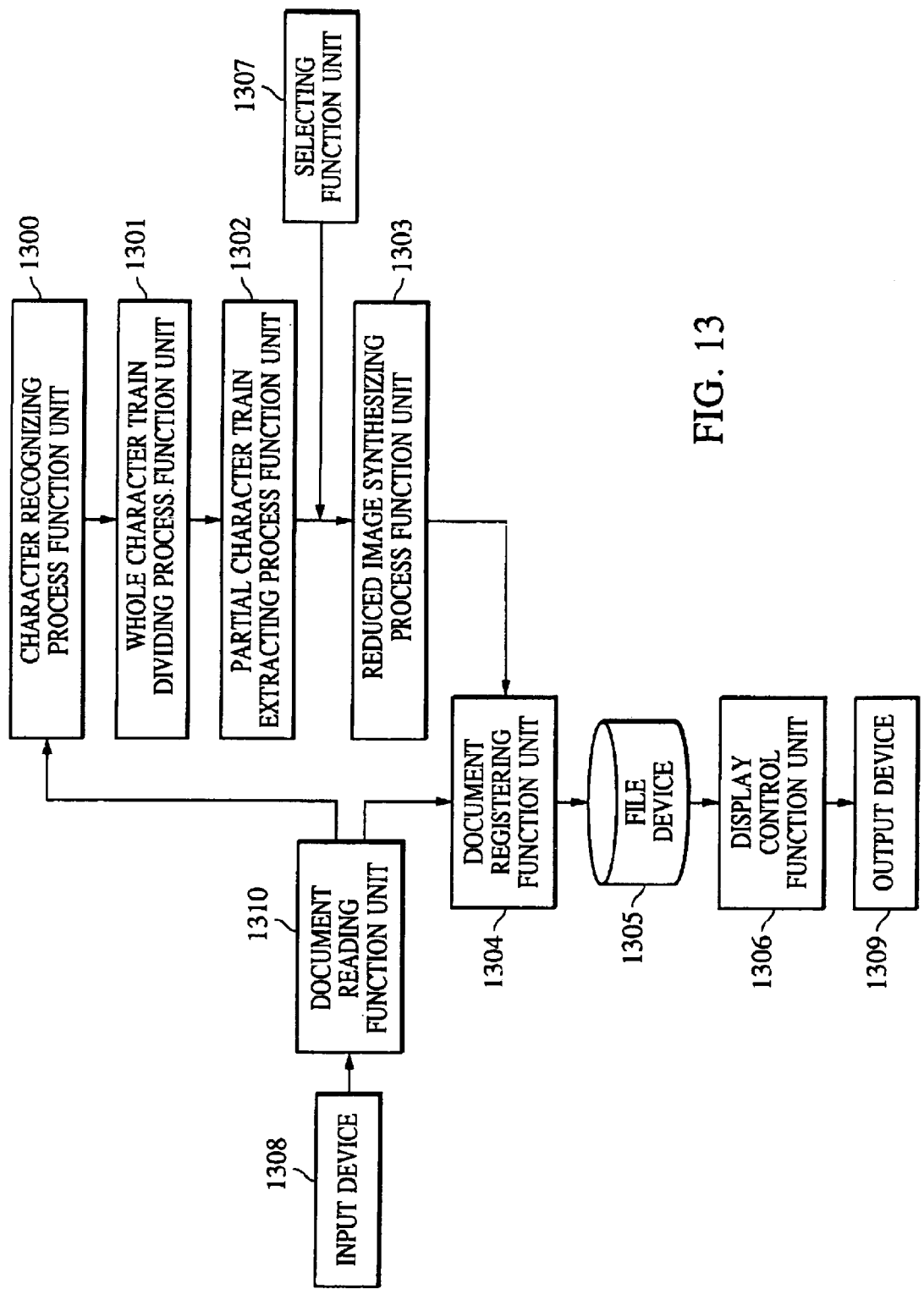
FIG. 13 is a block diagram showing a functional construction of an electric filing apparatus according to a second embodiment.

FIG. 13 is a block diagram showing a functional construction of an electric filing apparatus according to the present embodiment. Referring to FIG. 13, reference numeral 1300 denotes a character recognizing process function unit; 1301 a whole character train dividing process function unit; 1302 a partial character train extracting process function unit; 1303 a reduced image combining process function unit; 1304 a document registering function unit; 1305 a file device; 1306 a display control function unit; 1307 a selecting function unit; 1308 an input device; 1309 an output device; and 1310 a document reading function unit. Incidentally, the CPU 101 executes the control program loaded in the RAM 103 from the external storage device 106 and controls the scanner 107 and the external storage device 106, etc., thereby realizing the function units.

Figure 14:
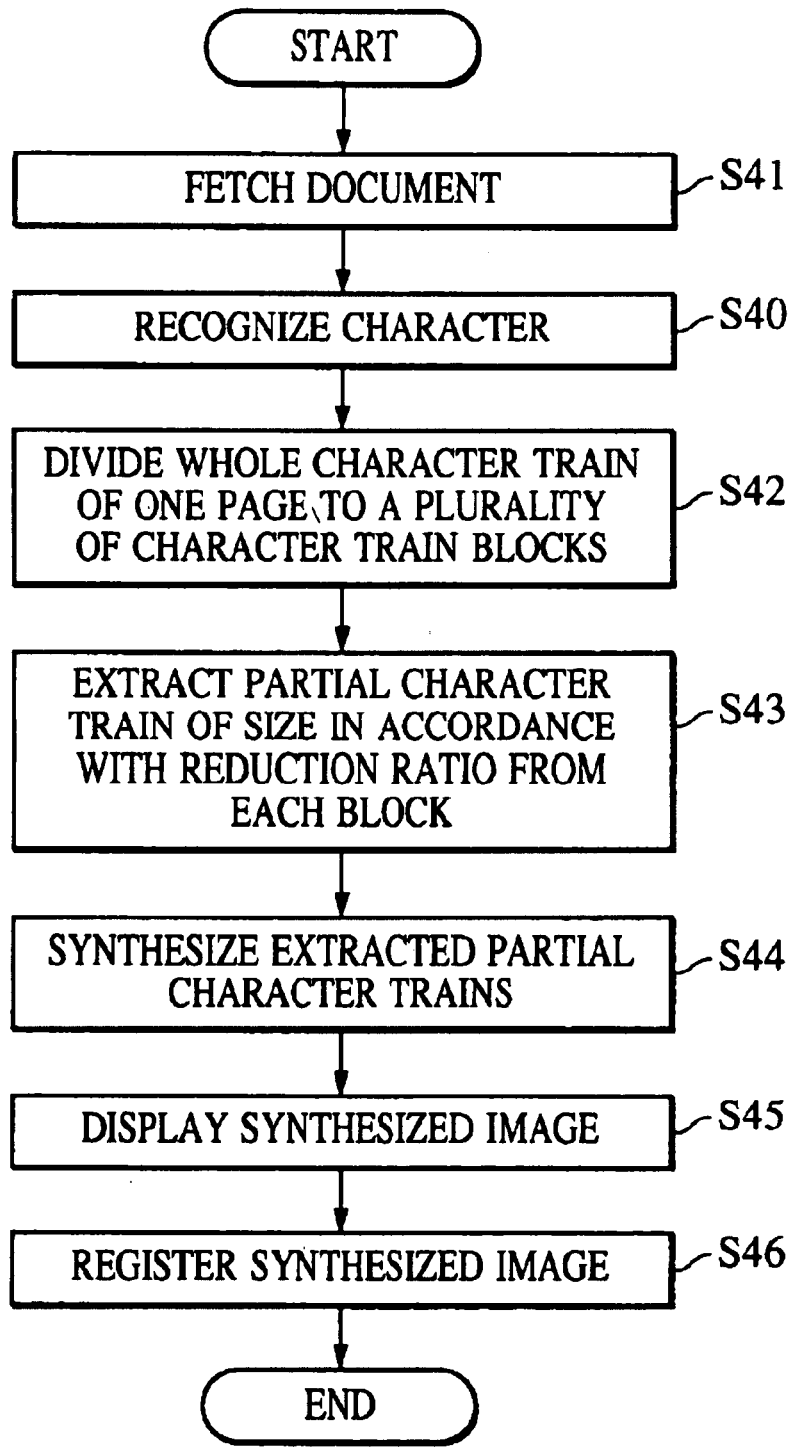
FIG. 14 is a flowchart for explaining an operation of the electric filing apparatus according to the second embodiment.

FIG. 14 is a flowchart for explaining the operation of the electric filing apparatus according to the present embodiment. The operation according to the present embodiment will be described with reference to FIGS. 13 and 14 hereinbelow.

First of all, the document reading function unit 1310 inputs document image data as a processing target from the input device 1308 (such as the scanner 107 and external storage device 106) and stores the image data into the memory (RAM 103) (step S41). The document image data may be data of a 400 dpi-resolution which is read by the scanner 107 in real time or may be data which is previously read and stored in the external storage device 106. The character recognizing process function unit 1300 reads an image from the memory (RAM 103) and outputs the recognized character. According to the present embodiment, in case of two or more spaces are successive, the character recognizing process function unit 1300 outputs only one space and outputs only one space in case of a carriage return line feed control code. The output by the character recognizing process function unit is obtained by coupling a character train as a set of sequent characters including no space by using a space. In other words, the output is a character train of the whole one page (step S40).

The image processing function unit 1301 uniformly divides the character train stored in the RAM 103 by a predetermined dividing number, thereby dividing the character train into a plurality of character train blocks (step S42).

According to the present embodiment, an image of the A4 size (1-page character information of the publication of the U.S. patent application) is divided into four blocks uniformly, as shown in FIG. 15. FIG. 15 is a diagram for explaining the division of the partial character train stored in the RAM 103 and the extraction of the partial character train. The divided blocks are labeled as character train blocks A, B, C, and D (21 to 24). It is a purpose of this division to extract features from the four portions in the uniform arrangement on the image. The partial character train extracting process function unit 1302 extracts a partial character train having a predetermined amount (a predetermined size) from each character train block which is divided by the character train dividing process function unit 1301 (step S43).

It is noted that the sequence after extraction has been described in the first embodiment, so that it is omitted herein. The partial character trains extracted in step S44 are combined, the combined image is displayed in step S45, and the combined image is registered in step S46.

Figure 16:
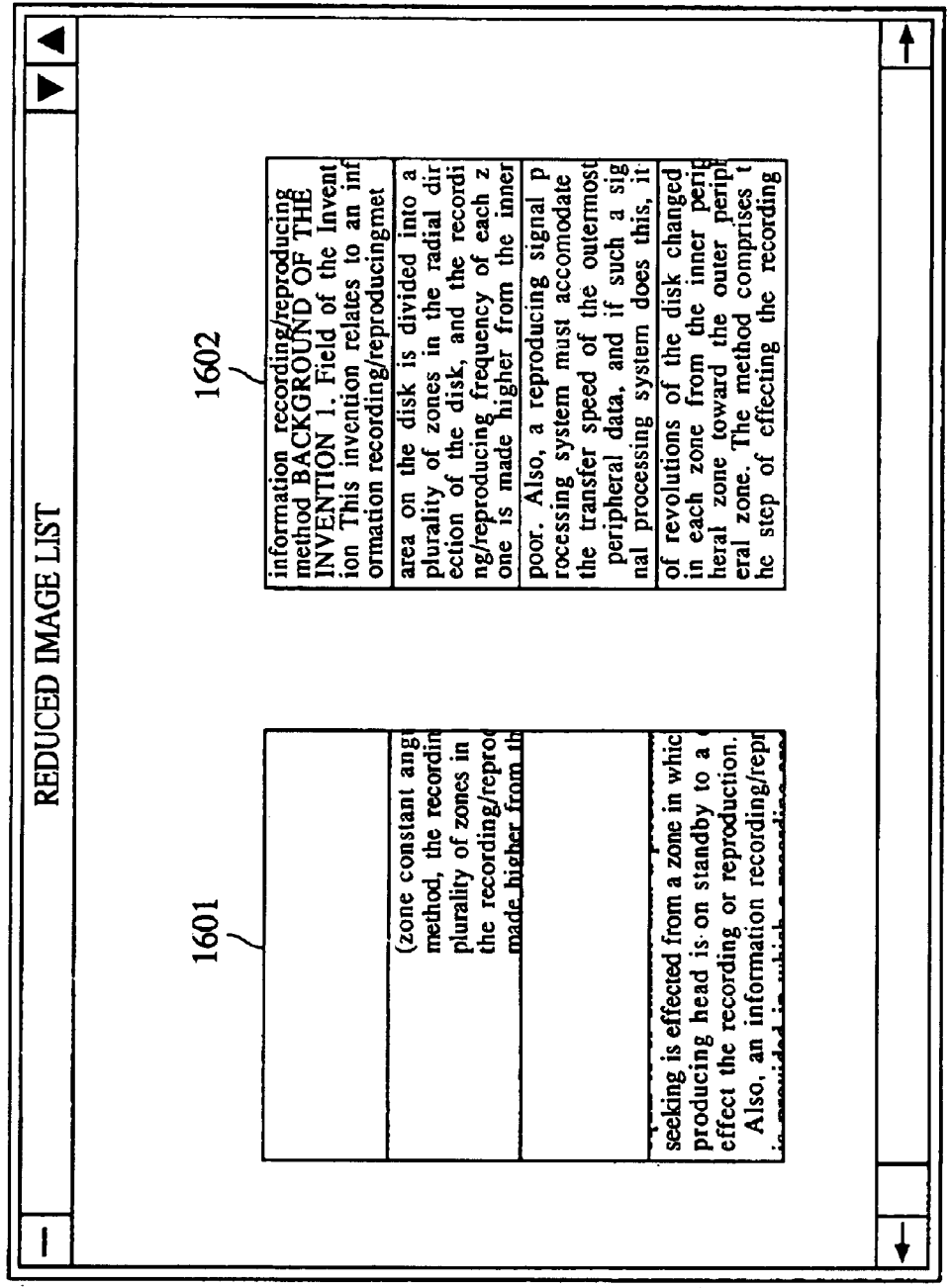
FIG. 16 is a diagram for explaining a state in which the reduced images are combined by using the extracted partial image or partial character train shown in FIGS. 5 and 15.

Reference numeral 1602 in FIG. 16 denotes the reduced image obtained by the processes.

Incidentally, it is premised that to manually set the selection from among the extracted partial character trains by the selecting function unit 1307 in the foregoing. According to the present embodiment, the following conditions are fixed, namely, whether or not one is selected if there are two or more font kinds, font sizes, character intervals, or spaces; whether or not a carriage return line feed; CRLF) code is removed; whether a spacing of the English word lap is ON/OFF; and the like. However, it is possible fully to select whether each setting by the selecting function unit 1307 is fixed or unfixed. If the setting is fixed, of course, each arbitrary setting can be performed manually. If the setting is unfixed, it is able to decide the setting automatically in accordance with the image information as a processing target. For instance, a standard character size on an OS is picked up and the best number of characters is automatically determined. On the other hand, it is possible fully to designate the number of characters and adjust the font size. If deciding the dividing number of character train blocks or the character number of the partial character train manually and arbitrarily, this case is included in the range of the present invention.

It is possible to select the position of the partial character train used for the reduced image, so that the document information is obtained advantageously.

As mentioned above, according to the present embodiment, the whole character train in the one page is combined with the partial character train extracted from a plurality of areas, thereby forming the reduced image, and thus the character is displayed within the decidable range, and the operator can discriminate the document contents indicated easily. That is, even with respect to the document with a similar layout and the document having no distinctive feature, the characters in the whole reduced image can be recognized, though the document is one part, using only the reduced image. As a result, the document can be identified easily.

Further, it is able to avoid a margin and a space by a carriage return line feed, etc. shown by 1601 in FIG. 16, as shown by 1602 in FIG. 16. It is possible to provide a reduced image having a large amount of information.

(Third Embodiment)

A third preferred embodiment according to the present invention will be described in detail with reference to the accompanied drawings hereinbelow.

The outline of an apparatus construction is as same as that of FIG. 1 which has been described in the first embodiment.

Figure 17:
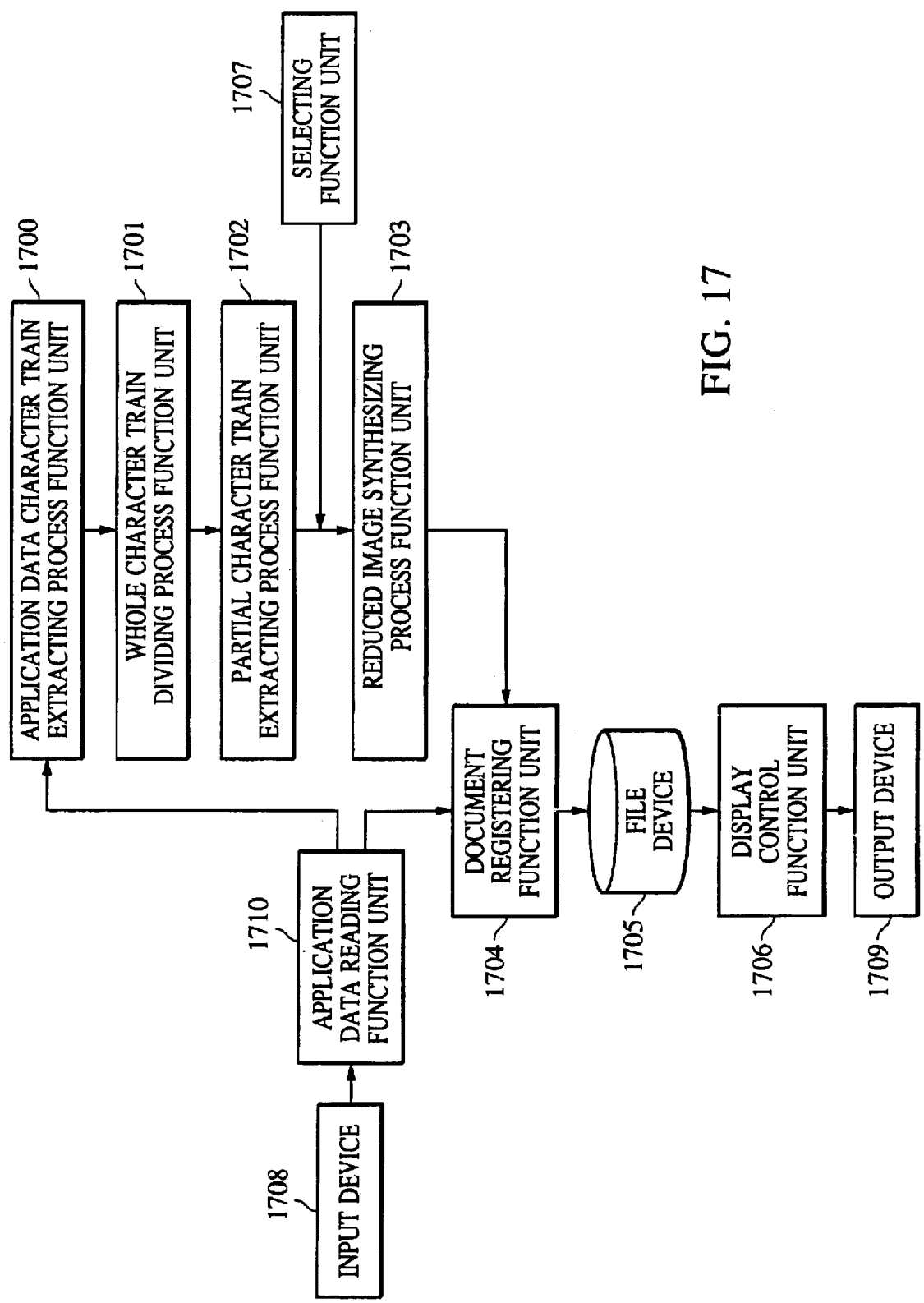
FIG. 17 is a block diagram showing a functional construction of an electric filing apparatus according to the third embodiment.

FIG. 17 is a block diagram showing a functional construction of an electric filing apparatus according to the present embodiment. Referring to FIG. 17, reference numeral 1700 denotes an application data character train extracting process function unit; 1701 a whole character train dividing process function unit; 1702 a partial character train extracting process function unit; 1703 a reduced image combining process function unit; 1704 a document registering function unit; 1705 a file device; 1706 a display control function unit; 1707 a selecting function unit; 1708 an input device; 1709 an output device; and 1710 an application data reading function unit. Incidentally, the CPU 101 executes the control program loaded in the RAM 103 from the external storage device 106 and controls the external storage device 106, thereby realizing the function units.

Figure 18:
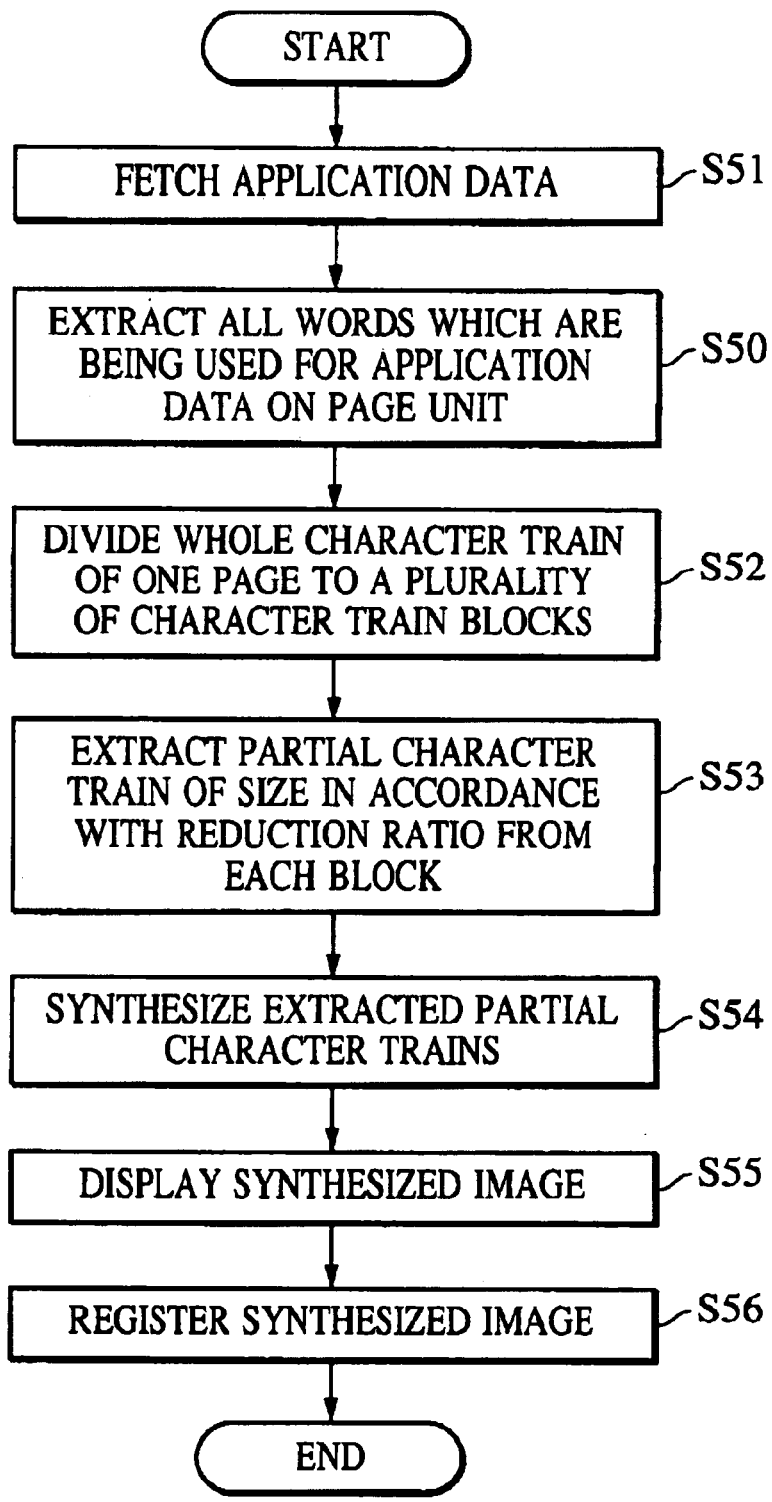
FIG. 18 is a flowchart for explaining an operation of the electric filing apparatus according to the third embodiment.

FIG. 18 is a flowchart for explaining the operation of the electric filing apparatus according to the present embodiment. The operation according to the present embodiment will be described with reference to FIGS. 17 and 18 hereinbelow.

First of all, the application data reading function unit 1710 is constructed by a software module, etc. which is the so-called "Outside In Viewer Technology" produced by INSO Corporation, and inputs application data (*.doc) formed by application software (e.g., "Microsoft Word" produced by Microsoft Corporation) from the input device 1708 (such as the external storage device 106) and stores the inputted data into the memory (RAM 103) (step S51). Note that the software module cannot read all of the application data, but a filter corresponding to a desired application is previously optionally installed, thereby making it possible to read the application data corresponding thereto, displaying the application data, and outputting the character included in the application data.

The application data character train extracting process function unit 1700 reads the characters in the application data from the memory (RAM 103), and converts the read character into a word. According to the present embodiment, when two or more spaces are successive, the spaces are replaced with one space. In the case where there is a carriage return line feed code, the code is also replaced with one space. Therefore, the output by the application data character train extracting process function unit 1700 is obtained by coupling a successive character train by using a space. Inother words, the output is a set of character trains of the whole head page. The output is shown by 420 in FIG. 15 (step S50).

The whole character train dividing process function unit 1701 uniformly divides the application data stored in the RAM 103 by a predetermined dividing number, thereby dividing the application data into a plurality of image blocks (step S52).

According to the present embodiment, FIG. 15 shows a diagram to uniformly divide into four blocks, a whole character train 420 having a proper amount which corresponds to the A4 size (1-page character information of the publication of the U.S. patent application) upon printing. The divided blocks are labeled as character train blocks A, B,. C, and D (121 to 124). It is a purpose of this division to extract features from the four portions in the uniform arrangement on the whole character train.

The partial character train extracting process function unit 1702 extracts a partial character train having a predetermined amount (only a predetermined character) from each character train block which is divided by the whole character train dividing process function unit 1701 (step S53). It is noted that the sequence after extraction has been described in the first embodiment, so that it is omitted herein, and the partial character trains extracted in step S54 are combined, the combined image is displayed in step S55, and the combined image is registered in step S56.

Reference numeral 1602 in FIG. 16 denotes the reduced image obtained by the processes.

Incidentally, although it is premised to manually set the selection of the extracted partial image by the selecting function unit 1707 in the foregoing, the selection may be set automatically. The detail has been described in the second embodiment, and therefore the description is omitted.

The present embodiment shows an example wherein although the reduced image combining process function unit 1703 converts the combined character train into the image and outputs the converted data as an image, a similar advantage is also obtained by outputting the combined character train to the display control function unit 1706 as a character as it is.

Herein, an example for selecting and displaying the document image will be described simply by using the thus-registered document image data and reduced image.

First , in order to select the document image, the user instructs the display of the list of the reduced images from the input device 104. Under the instruction, the CPU 101 sequentially reads out the reduced images stored in the external storage device 106, and displays the list on the display 105.

As shown in FIG. 7, a reduced image list window 701 is displayed on the display 105, and the list of the reduced images is displayed in the window. With regard to the reduced image displayed in the window 701, a divided position is displayed by a solid line 704 having a color different from that of the image so as to clearly identify the divided position. However, if it is unnecessary that the solid line is clearly identified, the display of the reduced image is not limited to the foregoing.

The user instructs the selection of one reduced image from the reduced images which are displayed in the list by using the input device 104. Under the instruction, the CPU 101 reads out the document image for the instructed reduced-image from the external storage device, sets a document image display window on the display 105, and displays the document image which is read out in the window.

According to the three embodiments, it is able to easily understand that the foregoing is the contents regarding the reduced-image formation which is preferable to an electric filing apparatus for searching, displaying, and printing image data of a document stored with relation to predetermined managing information as exemplified in FIGS. 6 and 9.

According to the present invention, it is possible to form a reduced image capable of easily identifying the contents of even the document with a similar layout and the document with no distinctive feature in the display of the document list and search result list.

Although one reduced image corresponds to the document comprising one page in the three embodiments, the reduced image is generated for one selected page (such as a front page of a publication of a U.S. patent application) in the document comprising a plurality of pages and the generated reduced-image may correspond to the document comprising a plurality of pages.

Although it is premised to manually set the selection from among the extracted partial images by the selecting function unit 7 in FIG. 2, the selecting function unit 1307 in FIG. 13, and the selecting function unit 1707 in FIG. 17, the selection can be automatically determined in accordance with the image information as a processing target. For example, it is discriminated whether or not the amount of black pixels is larger than a predetermined value for each partial image which is obtained by the division as shown in FIG. 8, and it is sufficient to adopt a partial image whose amount of black pixels is larger than the predetermined value.

It is noted that although the electric filing apparatus according to the present embodiment has various component elements for realizing functions for searching and printing the information of the document stored in the file device 5, 1305, or 1705 shown in FIG. 2, 13, or 17, other than the foregoing, this description is omitted herein.

Although the embodiment indicates an image shown in FIG. 6 or 9 as a reduced image, it is sufficient to have a function for displaying a normal reduced image in accordance with an instruction by the operator if he/she is interested in the layout of pages.

The present invention may be applied to a system comprising a plurality of pieces of equipment (such as a host computer, interface equipment, a reader, and a printer), alternatively to an apparatus comprising single equipment (such as a copying machine and a facsimile apparatus).

Obviously, the object of the present invention also can be attained by supplying to a system or an apparatus, a storage medium (or recording medium) which records a program code of software for implementing the functions of the embodiments, and by reading out and executing the program code stored in the storage medium by a computer (or CPU or MPU) in the system or apparatus. In this case, the functions of the aforementioned embodiments are implemented by the program code itself which is read out from the storage medium and the present invention comprises the storage medium which stores the program code. Obviously, the present invention includes a case wherein the functions of the aforementioned embodiments can be effected not only by executing the program code which is read out by the computer, but also by executing a part or all of the actual processes by the OS (Operating System) which operates on the computer on the basis of the instruction of the program code.

Obviously, the present invention further includes a case wherein the functions of the aforementioned embodiments can be effected by writing the program code read-out from the storage medium into a memory provided for a function expansion card inserted to the computer or a function expansion unit connected to the computer, and by thereafter executing a part or all of the actual processes by a CPU, etc. provided for the function expansion card or function expansion unit on the basis of the instruction of the program code.

What is claimed is:

1. A reduced image forming apparatus comprising:
   recording means for recording a plurality of images;
   dividing means for dividing each of the plurality of images into a plurality of image blocks;
   extracting means for extracting a plurality of partial images from each of the plurality of image blocks, the partial images being of a size in accordance with a reduction ratio from each respective block;
   generating means for combining the plurality of partial images extracted by said extracting means and generating a plurality of combined images, which correspond to respective ones of the plurality of images, smaller than the original image; and
   indicating means for indicating the plurality of combined images generated by said generating means.

2. An apparatus according to claim 1, wherein said dividing means divides said original image into a plurality of uniform image blocks.

3. An apparatus according to claim 1, wherein said extracting means obtains the partial image at a same position in each image block.

4. An apparatus according to claim 1, wherein said dividing means divides each said image block into a plurality of uniform partial images, and said extracting means obtains the partial image at a position set for each image block.

5. An apparatus according to claim 1, wherein said generating means decreases an image resolution within a range in which a character can be visually recognized as a character on said indicating means, and generates a combined image smaller than said original image.

6. An apparatus according to claim 1, wherein said extracting means further has application data extracting means for reading application data and extracting the application data.

7. An apparatus according to claim 6, wherein the application data is data which is formed in an application.

8. A reduced image forming method comprising:
   a dividing step, of dividing each of a plurality of images recorded by recording means into a plurality of image blocks;
   an extracting step, of extracting a plurality of partial images from the original image, the partial images being of a size in accordance with a reduction ratio from each respective block;
   a generating step, of combining the plurality of partial images extracted in said extracting step and generating a plurality of combined images, which correspond to respective ones of the plurality of images, smaller than the original image; and
   an indicating step, of indicating the plurality of combined images generated in said generating step.

9. A method according to claim 8, wherein said dividing step includes dividing the original image into a plurality of uniform image blocks.

10. A method according to claim 8, wherein said obtaining step divides said image block into a plurality of partial images, and obtains the partial image at a same position in each image block.

11. A method according to claim 8, wherein said obtaining step includes dividing each image block into a plurality of uniform partial images, and obtains the partial image at a position set for each image block.

12. A method according to claim 8, wherein said generating step includes decreasing an image resolution within a range in which a character can be visually recognized as a character in said indicating step, and generates a combined image smaller than the original image.

13. A method according to claim 8, wherein said extracting step further comprises an application data extracting step, of reading application data and extracting the application data.

14. A method according to claim 13, wherein the application data is data which is formed in an application.

15. A storage medium storing a control program for making a computer form a reduced image based on an original image, wherein said control program comprises codes for:
   a dividing step, of dividing each of a plurality of images recorded by recording means into a plurality of image blocks;
   an extracting step, of extracting a plurality of partial images from the original image, the partial images being of a size in accordance with a reduction ratio from each respective block;
   a generating step, of combining the plurality of partial images extracted in said extracting step and generating a plurality of combined images, which correspond to respective ones of the plurality of images, smaller than in original image; and
   an indicating step, of indicating the plurality of generated combined images generated in said generating step.

16. A medium according to claim 15, wherein said dividing step includes dividing the original image into a plurality of uniform image blocks.

17. A medium according to claim 15, wherein said extracting step includes dividing each image block into a plurality of partial images, and obtaining the partial image at a same position in each image block.

18. A medium according to claim 15, wherein said extracting step includes dividing the image block into a plurality of uniform partial images, and obtaining the partial image at a position set for each image block.

19. A medium according to claim 15, wherein said generating step includes decreasing an image resolution within a range in which a character can be visually recognized as a character in said indicating step, and generating a combined image smaller than the original image.

20. A medium according to claim 15, wherein said extracting step further comprises an application data extracting step, of reading application data and extracting the application data.

21. A medium according to claim 20, wherein the application data is data which is formed in an application.

22. A reduced image forming apparatus comprising:
   recording means for recording a plurality of documents;
   converting means for converting the plurality of documents into a plurality of character trains;
   dividing means for dividing each of the plurality of character trains converted by said converting means into a plurality of character train blocks;
   extracting means for extracting a partial character train from each of the plurality of character train blocks, by selecting a predetermined number of recognized characters from each block;
   generating means for combining a plurality of partial character trains extracted by said extracting means, converting the combined partial character trains into an image, and generating a plurality of combined images, which correspond to respective ones of the plurality of documents, smaller than the original document; and
   indicating means for indicating the plurality of combined images generated by said generating means.

23. An apparatus according to claim 22, wherein said converting means has:
   character train recognizing means for recognizing a character train; and
   replacing means for replacing two or more sequent spaces recognized by said recognizing means or a carriage return line feed control code and a plurality of spaces subsequent thereto with one space.

24. An apparatus according to claim 23, wherein said dividing means divides the character train replaced by said replacing means into a plurality of uniform character train blocks.

25. An apparatus according to claim 23, wherein said extracting means divides each character train block into a plurality of partial character trains, and obtains the partial character train at a same position in each character train block.

26. An apparatus according to claim 23, wherein said extracting means divides each character train block into a plurality of uniform partial character trains, and obtains the partial character train at a position set for each character train block.

27. An apparatus according to claim 22, wherein said generating means decreases an image resolution within a range in which a character can be visually recognized as a character on said indicating means, and generates a combined image smaller than the original image.

28. An apparatus according to claim 22, wherein said extracting means further has application data extracting means for reading application data and extracting the character train included in the application data.

29. An apparatus according to claim 28, wherein the application data is data which is formed in an application.

30. A reduced image forming method comprising:
   a converting step, of converting a plurality of documents recorded by recording means into a plurality of character trains;
   a dividing step, of dividing each of the plurality of character trains converted in said converting step into a plurality of character train blocks;
   an extracting step, of extracting a partial character train from each of the plurality of character train blocks, by selecting a predetermined number of recognized characters from each block;
   a generating step, of combining a plurality of partial character trains extracted in said extracting step, converting the combined partial character trains into an image, and generating a plurality of combined images, which correspond to respective ones of the plurality of documents, smaller than said document; and
   an indicating, step of indicating the combined images generated in said generating step.

31. A method according to claim 30, wherein said converting step includes:
   a character train recognizing step, of recognizing a character train; and
   a replacing step, of replacing a two or more sequent spaces recognized in said recognizing step or a carriage return line feed control code and a plurality of spaces subsequent thereto with one space.

32. A method according to claim 30, wherein said dividing step includes dividing the character train replaced in said replacing step into a plurality of uniform character train blocks.

33. A method according to claim 30, wherein said obtaining step includes dividing each character train block into a plurality of partial character trains, and obtaining the partial character train at a same position in each character train block.

34. A method according to claim 30, wherein said obtaining step includes dividing each character train block into a plurality of uniform partial character trains, and obtaining the partial character train at a position set for each character train block.

35. A method according to claim 30, wherein said generating step includes decreasing an image resolution within a range in which a character can be visually recognized as a character in said indicating step, and generating a combined image smaller than the image.

36. A method according to claim 30, wherein said extracting step further comprises an application data extracting step, of reading application data and extracting the character train included in the application data.

37. A method according to claim 36, wherein the application data is data which is formed in an application.

38. A storage medium comprising codes for:
   a converting step, of converting a plurality of documents recorded by recording means into a plurality of character trains;
   a dividing step, of dividing each of the plurality of character trains converted in said converting step into a plurality of character train blocks;
   an extracting step, of extracting a partial character train from each of the plurality of character train blocks, by selecting a predetermined number of recognized characters from each block;
   a generating step, of combining a plurality of partial character trains extracted in said extracting step, converting the combined partial character trains into an image, and generating a plurality of combined images, which correspond to respective ones of the plurality of documents, smaller than said document; and
   an indicating step, of indicating the combined images generated in said generating step.

39. A medium according to claim 38, wherein said converting step includes a character train recognizing step, of recognizing a character train.

40. A medium according to claim 38, wherein said converting step comprises a replacing step, of replacing two or more sequent spaces recognized in said recognizing step or a carriage return line feed control code and a plurality of spaces subsequent thereto with one space.

41. A medium according to claim 38, wherein said dividing step includes dividing the character train replaced in said replacing step into a plurality of uniform character train blocks.

42. A medium according to claim 38, wherein said obtaining step includes dividing each character train block into a plurality of partial character trains, and obtaining the partial character train at a same position in each character train block.

43. A medium according to claim 38, wherein said obtaining step includes dividing each character train block into a plurality of uniform partial character trains, and obtaining the partial character train at a position set for each character train block.

44. A medium according to claim 38, wherein said generating step includes decreasing an image resolution within a range in which a character can be visually recognized as a character in said indicating step, and generating a combined image smaller than the image.

45. A medium according to claim 38, wherein said extracting step further comprises an application data extracting step, of reading application data and extracting the character train included in the application data.

46. A medium according to claim 45, wherein the application data is data which is formed in an application.

* * * * *

UNITED STATES PATENT AND TRADEMARK OFFICE
CERTIFICATE OF CORRECTION

PATENT NO. : 6,996,293 B1  
APPLICATION NO. : 09/593775  
DATED : February 7, 2006  
INVENTOR(S) : Yoshihiko Watanabe It is certified that error appears in the above-identified patent and that said Letters Patent is hereby corrected as shown below:

TITLE PAGE:
Item (30) Foreign Application Priority Data, "11/171576" should read -- 11-171576 --.

TITLE PAGE:
Item (56) References Cited, U.S. PATENT DOCUMENTS,

| Insert: -- | US-6,201,894 | 03-2001 | Saito, Kazuyuki | 382/176 |
|---|---|---|---|---|
| | US-6,317,740 | 11-2001 | Mukherjea et al. | 707/4 |
| | US-6,006,240 | 12-1999 | Handley, John C. | 715/510 |
| | US-6,345,130 | 02-2002 | Dahl, Magnus | 382/286 |
| | US-6,539,116 | 03-2003 | Takaoka, Makoto | 382/229 |
| | US-6,434,276 | 08-2002 | Hirosawa et al. | 382/284 |
| | US-5,625,710 | 04-1997 | Katsuyama et al. | 382/209 -- |

COLUMN 1:  
Line 19, "as and" should read -- and --;  
Line 32, "has;" should read -- has: --;  
Line 57, "discriminated." should read -- be discriminated. --; and  
Line 58, "arises" should read -- poses --.

COLUMN 3:  
Line 33, "a" should be deleted; and  
Line 43, "varieties" should read -- variety --.

COLUMN 4:  
Line 52, "in capable" should read -- incapable --.

COLUMN 7:  
Line 21, "FIG. 16, as" should read -- FIG. 16. As --; and  
Line 22, "FIG. 16. It" should read -- FIG. 16, it --.

COLUMN 8:  
Line 7, "Inother" should read -- In other --;  
Line 51, "First," should read -- First, --;  
Line 56, close up right margin; and  
Line 57, close up left margin.

COLUMN 11:  
Line 35, "in" should read -- the --.

COLUMN 12:  
Line 66, "indicating, step" should read -- indicating step, --.

UNITED STATES PATENT AND TRADEMARK OFFICE
CERTIFICATE OF CORRECTION

PATENT NO. : 6,996,293 B1
APPLICATION NO. : 09/593775
DATED : February 7, 2006
INVENTOR(S) : Yoshihiko Watanabe It is certified that error appears in the above-identified patent and that said Letters Patent is hereby corrected as shown below:

COLUMN 13:
Line 5, "a two" should read -- two --.

Signed and Sealed this

Fourteenth Day of August, 2007

JON W. DUDAS
*Director of the United States Patent and Trademark Office*